United States Patent [19]

Mohri et al.

[11] 3,941,920

[45] Mar. 2, 1976

[54] RECEIVER FOR A STILL PICTURE BROADCASTING SIGNAL

[75] Inventors: Katsuo Mohri, Yokohama; Masaaki Fukuda, Kodaira; Tatsuo Kayano, Hachioji; Takehiko Yoshino, Yokohama, all of Japan

[73] Assignees: Hitachi, Ltd.; Hitachi Electronics Co., Ltd.; Nippon Hoso Kyokai, all of Tokyo, Japan

[22] Filed: May 20, 1974

[21] Appl. No.: 471,823

[30] Foreign Application Priority Data

May 23, 1973 Japan.............................. 48-56822

[52] U.S. Cl...................... 178/5.8 R; 178/69.5 TV
[51] Int. Cl.²...................... H04N 5/44; H04N 5/08
[58] Field of Search............. 178/5.6, 5.8 R, 69.5 R, 178/DIG. 23; 179/15 BS, 69.5 TV

[56] References Cited
UNITED STATES PATENTS

3,755,624  8/1973  Sekimoto..................... 178/69.5 TV

*Primary Examiner*—Howard W. Britton
*Assistant Examiner*—Mitchell Saffian
*Attorney, Agent, or Firm*—Stevens, Davis, Miller & Mosher

[57] ABSTRACT

A receiver for receiving a composite signal including a multivalue pulse code modulated information signal and a binary pulse code modulated synchronizing signal and for regenerating the information signal. The receiver comprises an identification circuit for the identifying binary pulse code signal and an identification circuit for identifying the multivalue pulse code signal to both of which the received composite signal is supplied. The synchronizing signal is detected and regenerated by using the identified signal identified by the identification circuit for identifying the binary pulse code signal. Also by using the regenerated synchronizing signal, the composite signal is pulse clamped and the pulse clamped composite signal is supplied to the identification circuit for identifying the multivalue pulse code signal and the identification is effected.

6 Claims, 10 Drawing Figures

FIG_1

FIG_2

FIG_3

FIG_4

FIG_5

FIG_6

FIG_7

FIG_8

FIG_9

FIG_10

RECEIVER FOR A STILL PICTURE BROADCASTING SIGNAL

BACKGROUND OF THE INVENTION

The present invention relates to a receiver for identifying a pulse signal in a composite signal transmission system including a multivalue pulse code modulated signal. In more detail, the present invention relates to a receiver for receiving a composite signal including a video signal and a pulse code modulated audio signal arranged in a predetermined sequence and also including a plurality of pulse coded synchronizing signals required for the reproduction of said video signal and audio signal inserted in a predetermined position of said video and audio signal, and for accurately identifying the pulse signals included in the composite signals.

A suitable embodiment of such a composite signal is a still picture broadcasting signal. The receiver according to the present invention is therefore suitable but not limited to use as a receiver for receiving the still picture broadcasting signal.

The still picture broadcasting signal has been disclosed in detail in application Ser. No. 361,581 filed in 1973, now U.S. Pat. No. 3,854,010, and will be briefly explained hereinafter to an extent to help the understanding of the present invention.

In one embodiment of the still picture broadcasting system, the video signal and the audio signal are transmitted alternately acccording to a predetermined sequence. In one mode of signal transmission in said broadcasting system, a video signal of 1/30 second duration and an audio signal of 1/15 second duration are transmitted alternately. The video signal is transmitted in a horizontal scanning period of $1/f_H$ $_1f_(\approx 65.3$ $\mu s)$ in the same manner as a standard television broadcasting signal during the video signal transmission period. The video signal can represent one picture during 1/30 period so that each different picture can be transmitted at each video signal transmission period.

During the audio signal transmission period, a sampled audio signal is transmitted at a repetition period of $1/f_A$ which is different from the horizontal scanning period of the video signal. The audio signal is pulse code modulated and a plurality of auido signals are transmitted in a time division multiplex scheme. One audio signal is transmitted at each of the above sampling period of $1/f_A$. In the transmission of such a still picture broadcasting signal, in order to increase the number of multiplexed audio signals without widening the required frequency band of the transmission path, the audio signals may be transmitted in a multivalue pulse code modulated signal, for instance as a quarternary code.

The synchronizing signals required for the reproduction of such video signal and audio signal must be transmitted at each $1/f_H$ period during the video signal transmission period and at each $1/f_A$ period during the audio signal transmission period. Besides the two kinds of synchronizing signals, a number of synchronizing signals having different repetition periods are required, for instance bit synchronizing signals, synchronized with the modulated pulse series for demodulating the pulse code modulated signal is required. In one mode of such a still picture broadcasting system, all of such synchronizing signals may be formed from pulse coded signals. The pulse coded synchronizing signals are formed of binary pulses. The synchronizing signals contain a blanking period, PCM frame pattern signal (PFP signal), and mode control code signal (MCC signal). The PFP signal is formed by pulses of a predetermined pattern having the same bit timing with the modulated pulse series of the audio multiplex signal. This pulse pattern is common to any one of the synchronizing signals having various repetition periods. Accordingly, the PFP signal can be utilized for the detection of the position of insertion of the synchronizing signals. The MCC signal contains synchronizing signals such as a horizontal synchronizing signal, audio PCM frame synchronizing signal and video frame synchronizing signal, etc., and synchronizing signals for representing the transmission period of the video signal or the audio signal.

In order to derive such synchronizing signals and pulse code modulated audio signal, it is necessary to identify the received signal in a usual manner as is the case in the conventional pulse signal transmission system. In this case, in order to identify a quarternary pulse signal, the tolerance of the deviation of the input signal leve! with a reference level becomes one third with respect to that of the case of the binary pulse signal.

When transmitting a composite signal such as the still picture broadcasting signal by using a carrier signal, the dc level of the detected composite signal becomes usually unstable due to deviation of gain of the tuner or intermediate frequency circuit of the receiver or due to variation of the ambient temperature. Accordingly, identification error tends to occur when an output signal of the intermediate frequency circuit is dc coupled to an identification circuit.

Also if an ac coupling is used in order to avoid the influence of variation of the dc level, the lower components are not transmitted so that ripples may occur. If such ripples are contained, the tolerance in the identification decreases so that an increase in identification errors is unavoidable.

In order to avoid the above mentioned problems, a peak clamp system using a diode and a capacitor may be used before identification of the signal in a conventional PCM transmission system.

Even if such peak clamp system is employed, there will still remain a deviation in the regenerated dc level depending upon the signal content by reason of the ratio $r_b/r_f$, the ratio of a forward resistance $r_f$ of the diode and a reverse resistance $r_b$ thereof. Accordingly, such practice does not afford a basic solution and the peak clamp system applied before identification of the input signal including the quarternary PCM signal will not give a satisfactory result.

SUMMARY OF THE INVENTION

The object of the present invention is to realize an identification circuit for accurately identifying a composite signal including a multivalue PCM signal having less tolerance with level variation.

Another object of the present invention is to realize an identification circuit for making an accurate identification in a simple construction.

A further object of the present invention is to obtain a receiver suitably used in the reception of a still picture broadcasting signal.

A still further object of the present invention is to realize a still picture broadcasting signal receiver which is able to reproduce a stable video signal having no dc level variation from a still picture broadcasting signal.

In one aspect of the present invention, two sets of the identification circuits for identifying the received signal are provided. The input signal which may contain a level variation is applied to one of the identification circuits and various synchronizing signals formed in binary pulse signals are detected from the identified output and the various synchronizing signals are regenerated. The regenerated synchronizing signals are utilized to make pulse clamping of the input signal and the pulse clamped input signal suppressed for the level variation is applied to the other identification circuit and the multivalue pulse signals are accurately identified.

DESCRIPTION OF THE PREFERRED EMBODIMENT

Before making detailed explanation of the present invention, a suitable composite signal to be received by a receiver according to the present invention, for instance, one embodiment of a still picture broadcasting signal will be explained by referring to FIGS. 1 and 2.

Figure 1:
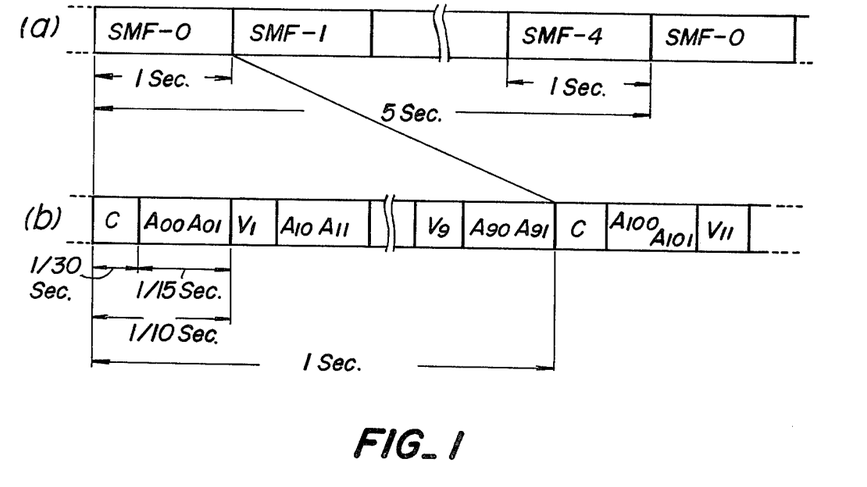
FIGS. 1 and 2 are signal waveform diagrams for explaining one embodiment of a still picture broadcasting signal.

The still picture broadcasting signal has a 5 second repetition period as shown in FIG. 1a, and in this 5 second period, five submaster frames SMF-O, SMF-1 . . . SMF-4 each having 1 second duration are inserted continuously. After a lapse of 5 seconds, the same submaster frame will be transmitted again. One submaster frame SMF consists of 30 television frames each having 1/30 second duration as shown in FIG. 1b. Among the 30 television frames, nine frames are used as video frames V for inserting video signals. The video signal can represent a picuture at each one television frame. Accordingly, by inserting each one of different video signals representing different pictures in each of the video frames V, altogether 45 kinds of pictures may be transmitted in five submaster frames. The other 20 frames in one submaster frame are used as an audio frame A for inserting audio signals. The audio frame A is used for two successive television frames, the former half is termed an audio first frame and the latter half is termed an audio second frame. A plurality of channels of audio signals are pulse code modulated and transmitted in time division multiplex in the audio frame A. In order to increase the number of multiplication, quarternary pulses are used for the pulse code modulated signal to be considered in the present invention. The rest of the television frame is used as a control frame C for inserting the control signal. In the still picture broadcasting system, the above mentioned plurality of video and audio signals are combined to form one particular program. Combinations of the video and audio signals may be reproduced in a desired sequence or in a previously determined sequence according to the program. The control signal inserted in the control frame C is a signal for designating the combination of the video and audio signals and sequence of the reproduction. In the submaster frame SMF, the control frame C is transmitted at the top as shown in FIG. 1b.

Figure 2:
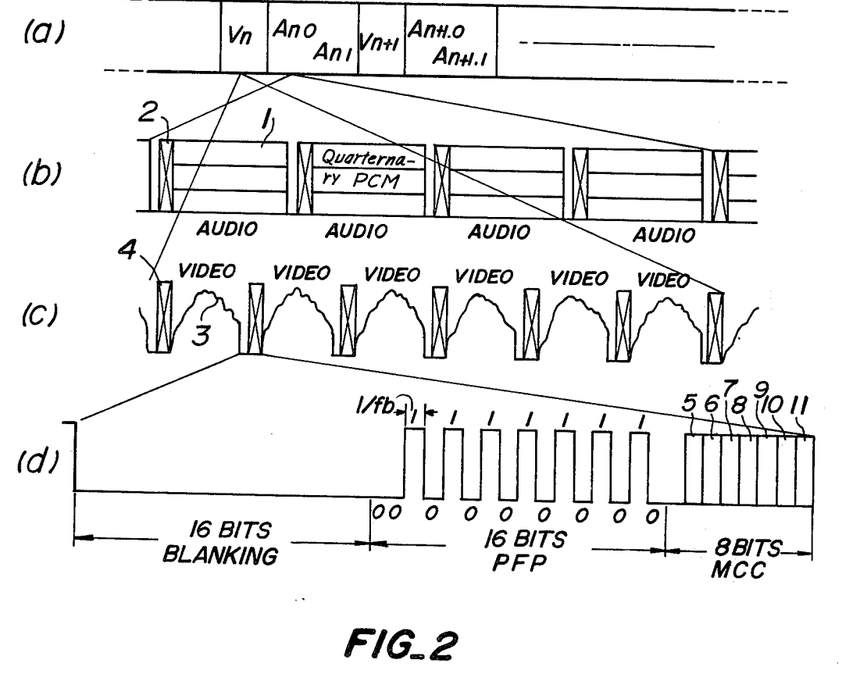

FIG. 2 is a waveform diagram showing more detail of the signal inserted in such video frame V and audio frame A. FIG. 2a is a waveform the same as FIG. 1b. In an audio frame A, a quarternary pulse code modulated audio multiplex signal 1 and a binary pulse code modulated synchronizing signal 2 are inserted as shown in FIG. 2b.

The audio multiplex signal is transmitted in a repetition period $1/f_A$ ($f_A \approx 10.5$ KHz) equal to the sampling period at the sampling of the processed audio signal. This period is termed an audio PCM frame period hereinafter. The synchronizing signal 2 for the reproduction of the audio signal is inserted at a $1/f_A$ repetition period.

In a video frame V, a video signal 3 according to an NTSC system and a synchronizing signal 4 corresponding to the synchronizing signal 2 in FIG. 2b are inserted as shown in FIG. 2c. The synchronizing signal 4 is inserted at each horizontal scanning period $1/f_H$ ($f_H = 15.734$ KHz). Accordingly, the ratio of repetition frequencies of the synchronizing signals 2 and 4 is in the following relationship.

$$f_A/f_H = \frac{2}{3}$$

The positions where the synchronizing signals 2 and 4 are inserted, in other words, the phases of the both synchronizing signals 2 and 4 coincide at a greatest common measure frequency of about 5 KHz of the $f_H$ and $f_A$ as shown in FIGS. 2b and 2c. The synchronizing signals 2 and 4 are formed of a 16 bit blanking period, 16 bit PCM frame pattern signal (referred to as a PFP signal) and 8 bit mode control code signal (referred to as an MCC signal).

The PFP signal is a series of pulses synchronized with the modulated pulse series of the pulse code modulated audio multiplex signal having a 16 bit fixed pulse pattern of 0010101010101010. By detecting this fixed pulse pattern, the bit synchronizing signal ($f_b$=6.5454 MHz) for taking identification timing of said pulse code modulated signal (PCM signal) is regenerated. The frequency $f_b$ of the bit synchronizing signal is so chosen as to have an integral ratio with both $f_H$ and $f_A$. The PFP signal is not only synchronized with the pulse series of the audio PCM signal but it can be utilized for detecting the synchronizing signal 2 or 4 including such PFP signal.

The 8 bit MCC signal represents the repetition period of the horizontal scanning period, audio PCM frame period and other synchronizing signals and it can be used as a synchronizing signal. In the 8 bit pulses, pulses 5–11 for representing seven kinds of synchronizing signals are contained as shown in FIG. 2d. Namely, pulse 5 represents horizontal synchronizing signal of repetition frequency 15.734 KHz, pulse 6 represents the audio PCM frame synchronizing signal of repetition frequency 10.5 KHz, pulse 7 represents the frame synchronizing signal of repetition frequency of 30 Hz, pulse 8 represents a synchronizing signal for indicating the position of the control frame, pulses 9 and 10 represent synchronizing signals for indicating a position of the audio first and audio second frames, and pulse 11 represents a synchronizing signal for indicating a position of the video frame, respectively. In the pulses 5–11 representing the synchronizing signals, the respective synchronizing signal is inserted when the pulse has value 1 and the synchronizing signal is not inserted when the pulse has value 0.

As for an example if we consider the MCC signal of the synchronizing signal inserted in the video frame V, the synchronizing signal 4 is inserted at a repetition period of the horizontal synchronizing signal so that the pulse 5 of the MCC signal in this period assumes always 1, also the pulse 11 representing the video frame also assumes a value 1. The audio PCM frame synchronizing signal and the horizontal synchronizing signal coincide with their phases at the common measure frequency of the repetition frequencies thereof as shown in FIGS. 2b and 2c, so that the pulse 6 in the MCC signal at a position where the phases of both the signals coincide assumes a value 1 even in the video frame period. The other pulses assume value 0 in the video frame V.

Figure 3:
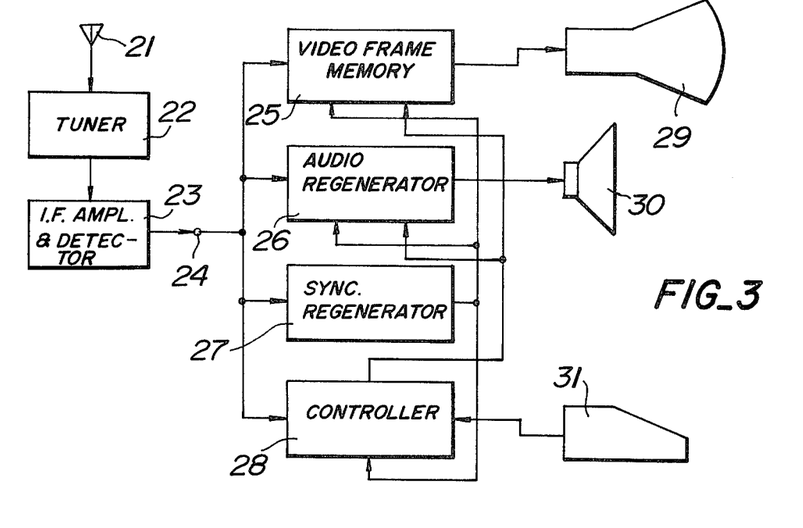
FIG. 3 is a block diagram showing an outline of a still picture broadcasting signal receiver.

The still picture broadcasting system as shown in FIGS. 1 and 2 may be received by a receiver as indicated in FIG. 3.

FIG. 3 is a block diagram showing a brief outline of such a still picture broadcasting signal receiver. In FIG. 3, 21 is an antenna to which a carrier signal modulated by the aforementioned still picture broadcasting signal is applied. 22 is a tuner and 23 is an intermediate frequency circuit including a detector. The high frequency still picture broadcasting signal supplied to the antenna 21 is converted into a base band still picture broadcasting signal as shown in FIG. 2 through the tuner 22 and the intermediate frequency circuit 23 and it appears at the output of the output terminal 24. The still picture broadcasting signal obtained at the terminal 24 is detected for its various synchronizing signals in the synchronizing signal regenerator 27 and signals synchronized thereto are regenerated. The regenerated synchronizing signals are supplied to various portions of the receiver for the reproduction of video and audio signals.

Selection instruction board 31 produces an instruction signal for the detection of a desired couple of video and audio signals and applies it to a controller 28. The controller 28 produces a trigger pulse for detecting the designated video signal and audio signal designated by said instruction signal when such signals are transmitted. The trigger pulse is supplied to a video frame memory 25 and to an audio regenerator 26. The video frame memory 25 derives only the desired video signal from the still picture broadcasting signal supplied from the terminal 24 based on said trigger pulse and memorizes 1 frame picture. A still picture may be reproduced by repeatedly reproducing the memorized 1 frame signal and supplying it to a cathode ray tube 29 as a display. The audio regenerator 26 detects and derives the desired audio signal from the still picture broadcasting signal and reproduces the voice by supplying the signal to a speaker 30.

A more practical circuit diagram used in such kind of receiver which is able to accurately reproduce required signals from a composite signal including a quarternary PCM signal will be explained by referring to further drawings.

Figure 4:
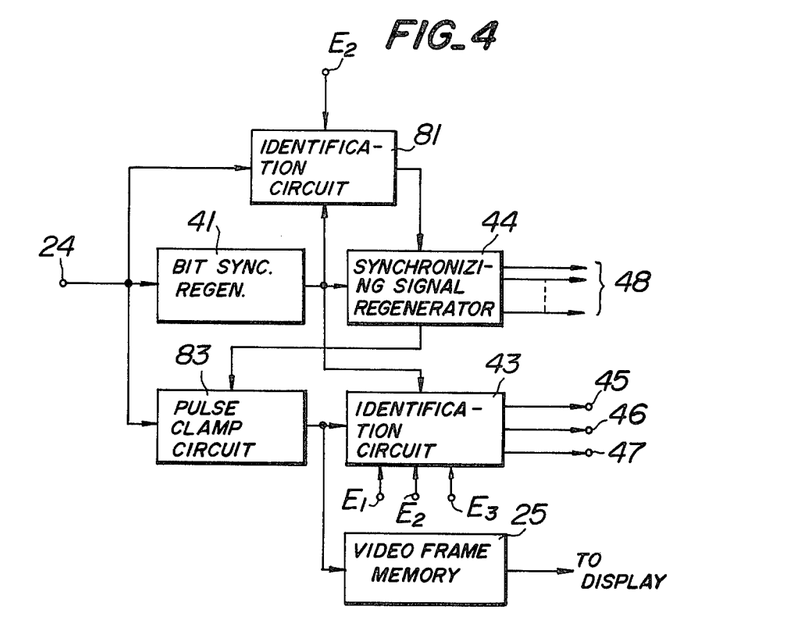
FIG. 4 is a block diagram showing an essential portion of the receiver according to the present invention.
Figure 5:
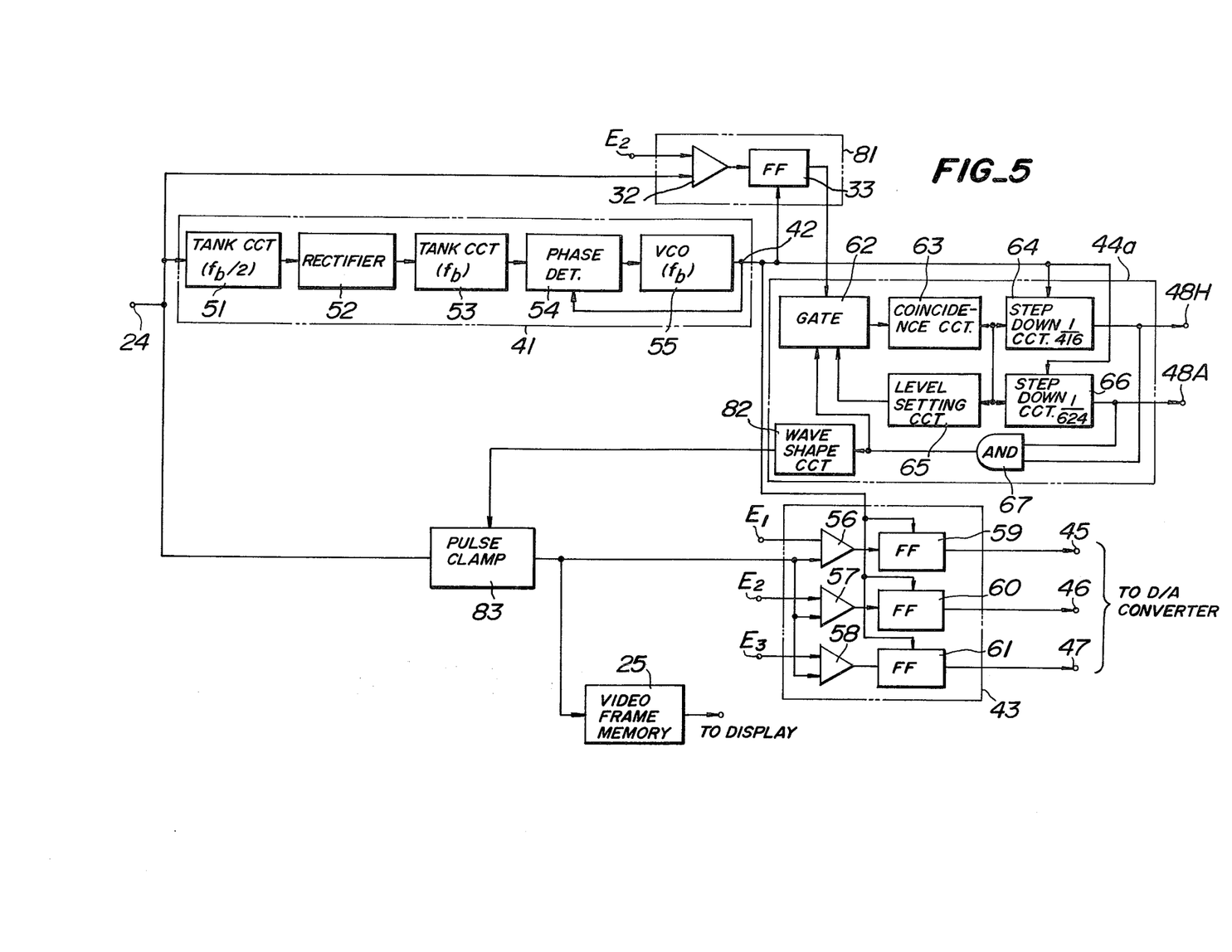
FIG. 5 is a block diagram showing more detail of the circuit shown in FIG. 4.

FIG. 4 is a block diagram showing an essential portion of a receiver according to the present invention and FIG. 5 is a block diagram showing more detail thereof.

In FIG. 4, 81 is an identification circuit for identifying the binary pulse signal in the input signal by using a voltage $E_2$ corresponding to an intermediate level of the signal level as a reference level. 43 is an identification circuit for identifying the quarternary pulse signals in the input signal by comparing it with three voltages $E_1$, $E_2$, $E_3$ as the reference levels.

A bit synchronizing signal regenerator 41 detects the bit synchronizing signal component contained in the audio PCM signal, PFP signal, etc., in the still picture broadcasting signal supplied to the terminal 24 and having a waveform as shown in FIG. 2 and regenerates the bit synchronizing signal. The regenerated bit synchronizing signal is supplied both to the identification circuit 43 and to the identification circuit 81 and the applied still picture broadcasting signal to the terminal 24 is identified by using the bit synchronizing signal as the timing signal.

At first, we may assume a case in which the input signal supplied to the terminal 24 converted into a base band through a tuner and the intermediate frequency circuit is dc coupled. In this case, the signal is supplied to the identification circuit 81 and identified therein and the output signal is supplied to a synchronizing signal regenerator 44. In this case, as mentioned above due to dc level variation in the intermediate frequency circuit and others, a perfect dc reproduction has not been effected so that the output signal of the identification circuit 81 may include more or less identification error. However, as the synchronizing signals are transmitted in the binary pulse signal as shown in FIG. 2d, the error may be considerably less if compared with the case of quarternary the value pulse signal. Accordingly, by using this output signal, the synchronizing signal may be sufficiently regenerated with considerable accuracy. The binary pulse signal obtained from the identification circuit 81 is supplied to synchronizing signal regenerator 44. The synchronizing signal regenerator 44 derives the PFP signal and MCC signal from the binary pulse signal and detects various synchronizing signals such as the horizontal synchronizing signal, audio PCM frame synchronizing signal, etc. Furthermore, the bit signal obtained from bit synchronizing signal regenerator 41 is so processed as to step down the frequency to obtain signals having equal frequency with the various synchronizing signals and regenerates various synchronizing signals by making phase control by using the above mentioned detected synchronizing signals.

In the manner mentioned above, by using the regenerated synchronizing signals a pulse signal synchronized with the blanking period inserted before the PFP signal is obtained and the signal is supplied to a pulse clamp circuit 83 so as to clamp the blanking period of the input signal and a perfect dc reproduction is obtained. The dc reproduced input signal is supplied to the identification circuit 43 and identified signals containing no error may be obtained at the output terminals 45 to 47 by comparing the signal with three reference voltages $E_1$, $E_2$, $E_3$.

In the pulse clamp circuit 83, the same perfect dc reproduction of the video frame signal is effected so that a correct video signal may be reproduced by supplying the output signal to a video frame memory 25.

More detailed explanation of the circuit operation will be given by referring to FIG. 5.

The bit synchronizing signal regenerator 41 consists of two tank circuits 51 and 53, a rectifier 52 for doubling the frequency of the applied signal, a phase detector 54 and a voltage control type oscillator (VCO) 55.

The still picture broadcasting signal supplied to the terminal 24 is fed to a tank circuit 51 tuned with one half of the bit frequency $f_b$ so as to emphasize the basic frequency component of the PFP signal. The output signal thereof is supplied to the rectifier 52 to make frequency doubling. The signal is fed to the tank circuit 53 tuned with the frequency $f_b$ so as to derive the $f_b$ component and to apply sufficient attenuation of the other frequency component. The signal having the frequency $f_b$ is applied to the voltage control type oscillator 55 and to the phase detector 54 forming an automatic phase control circuit In this manner, the bit synchronizing signal synchronized with the pulse series of the audio PCM signal and the PFP signal may be obtained at an output of the oscillator 55.

The identification circuit 81 is formed of a comparator 32 and edged trigger flip-flop circuit 33. The regenerated bit synchronizing signal obtained from the bit synchronizing signal regenerator 41 is applied to the edged trigger flip-flop circuit 33 of the identification circuit 81. The still picture broadcasting signal applied at the terminal 24 is applied to the comparator 32. An output signal obtained from the comparator 32 by comparing the input signal with a reference voltage $E_2$ is identified by the pulse signals synchronized with the bit timing signal in the flip-flop circuit 33. In this arrangement at the output of the identification circuit 81, a signal effected binary identification is obtained so that the PFP signal, MCC signal or the like will be obtained in an exact pulse waveform.

The pulse signal is supplied to a synchronizing signal regenerator 44 and the signal is applied to a coincidence circuit 63 through a gate circuit 62. The coincidence circuit 63 is a circuit for producing one continuous pulse as a coincidence signal when a pulse having a predetermined pattern is given to the input. One practical embodiment of such a coincidence circuit is shown in FIG. 6.

Figures 6, 7, 8:
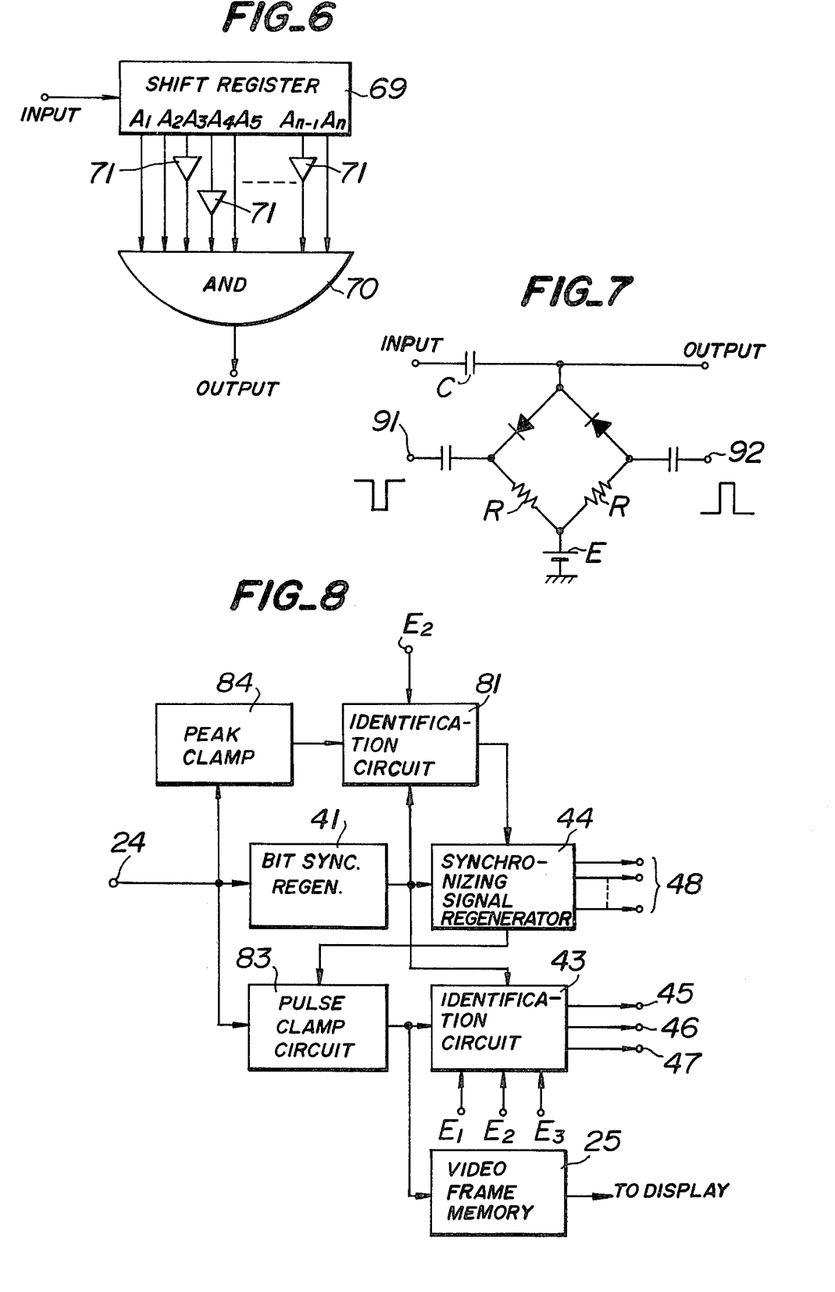
FIG. 6 is a block diagram showing a more practical composition of a coincidence circuit.
FIG. 7 is a circuit diagram for showing one embodiment of a pulse clamp circuit.
FIGS. 8 and 9 are block diagrams showing essential parts of modified embodiments of the present invention.

In FIG. 6, the pulse signal applied to a shift register is shifted to each succeeding stage bit by bit. The signal at each stage of the shift register 69 is supplied to an AND gate 70 directly or through an inverter 71. In the AND gate 70, an output is produced as a coincidence pulse when all the inputs have a value 1. Accordingly, a coincidence pulse is produced at the output when a signal having a pattern depending upon the inserting positions of the inverters between the shift register 69 and the AND gate 70 is applied to the input. In the embodiment shown in FIG. 6, when the input signal having a pattern 1010 ... 10011 (the portion ... represents a repetition of 10) is applied to the input, then the coincidence pulse is delivered to the output. Namely, this signal corresponds to the 14 bit signal of the PFP signal shown in FIG. 2d taking away the initial 2 bits of 00 and the first three pulses of the MCC signal in which the initial pulse is 0 and when the pulse 5 representing the horizontal synchronizing signal and the pulse 6 representing the audio PCM frame synchronizing signal are both value 1. If this signal is applied to the shift register 69, an output coincidence pulse is delivered from the AND gate 70. Accordingly, the output of the AND gate 70 assumes a pulse signal having a repetition frequency corresponding to the greatest common measure frequency of about 5 KHz of the horizontal synchronizing signal $f_H$ and audio PCM frame synchronizing signal $f_A$.

Now back to FIG. 5, the bit synchronizing signal of about 6.5 MHz obtained at the output terminal 42 of the oscillator 55 is supplied to step down circuits 64 and 66. The signal is processed to frequency division into 1/416 and 1/624 to obtain signals of the horizontal synchronizing signal frequency and audio PCM frame synchronizing signal frequency, respectively. By controlling the phase of the step down circuits 64 and 66 by applying the output signal of said coincidence circuit 63, a horizontal synchronizing signal and an audio PCM frame synchronizing signal having the correct phase are obtained at the output terminals 48H and 48A of the step down circuits 64 and 66, respectively.

By applying the synchronizing signals obtained at the output terminals 48H and 48A to an AND gate 67, a pulse signal having a frequency of the greatest common measure frequency of $f_H$ and $f_A$ the same as the output of the coincidence circuit 63 may be obtained. The obtained pulse signal is applied to the gate circuit 62 as a gate pulse and by gating the output signal of the identification circuit 81, only the synchronizing signal portion may be gated which does not include noises, the audio signal and video signal or some simulated pulse signal included accidentally so that they may be eliminated to improve the stability of the reproduced synchronizing signal.

When the pulse width of the output pulse signal of the AND gate 67 is so narrow that it does not include a portion corresponding to the sum of the PFP signal and MCC signal, then a circuit for widening the pulse width (not shown) may be provided before supplying the signal to the gate circuit 62. On the contrary, in case the pulse width is wider to include signals other than the synchronizing signal portion, then the circuit for narrowing the pulse width (not shown) may be provided thereto. The above mentioned circuits may be formed from monostable multivibrator circuits for either of the cases.

If the synchronization is lost by some causes, then the signal portion other than the synchronizing signal may be gated so that at the output of the coincidence circuit 63, the coincidence pulse may not be derived and in such an occasion the synchronization will not be attained over a considerable time. Considering such situation, the gate circuit 62 must have a function to pass all of the input signals while stopping the gate function. The level setting circuit 65 is a circuit provided for this purpose. This level setting circuit 65 produces a voltage having a value higher than a predetermined level when the coincidence pulse is given to the input and to hold a certain voltage for a predetermined time period. This circuit controls the gate circuit 62 to operate as a gate when the voltage has a value over the predetermined value. The circuit 65 controls to release the gate operation of the gate circuit 62 when the voltage decreases less than the above predetermined value when the coincidence pulse is not given to the input.

The time for holding the predetermined voltage by said level setting circuit 65 is so chosen to be longer than the repetition period of the normally obtained coincidence pulse, and the output voltage of the level setting circuit 65 assumes a higher value than the above value during the time when the output signals of the step down circuits 64 and 66 synchronize with the input synchronizing signal. Therefore, only the synchronizing signal portion may suitably be derived from the input signal and the synchronized condition can be maintained. By any reason, if the phase of the output signal of the step down circuits 64 and 66 does not coincide with the synchronizing signal, then the output signal of the gate circuit 62 gated out by the gate pulse obtained from the output signals of the two step down circuits 64 and 66 may not include the PFP signal and the MCC signal. In this case, the coincidence pulse is not obtained from the coincidence circuit 63 so that the output voltage of the level setting circuit 65 decreases and the gate function of the gate circuit 62 is released and the input signal passes through the gate circuit 62. In this case, the PFP signal and the MCC signal will be again supplied to the coincidence circuit 63. Accordingly, the coincidence pulse is produced again. The coincidence pulse functions to reset the step down circuits 64 and 66. By this operation, the output signals of the step down circuits 64 and 66 synchronize with the synchronizing signal instantaneously and at the same time the coincidence pulse is applied to the level setting circuit 65 and as the output voltage of the level setting circuit 65 assumes a value higher than the predetermined value, the input signal is gated by the output signal from the AND gate 67 in the gate circuit 62.

In the manner mentioned above, various synchronizing signals such as the bit synchronizing signal may be regenerated. In this case, all of the synchronizing signals are coded by a binary pulse signal so that an accurate identification may be effected in the identification circuit 81 even if some level variation is applied to the input signal. Thus, the various synchronizing signals may be regenerated in a stable manner. As for the synchronizing signal regenerator mentioned above, a circuit as disclosed in the application Ser. No. 361,802 filed in 1973 may be used.

By using the regenerated synchronizing signals, the blanking period as shown in FIG. 2 may be easily detected. By fixing the level of the blanking period by means of a pulse clamp circuit 83, a signal having no dc level variation may be obtained.

For making a pulse clamp for the input composite signal by using the regenerated synchronizing signal, for instance the output signal of the AND gate 67 producing a pulse signal having a frequency of the greatest common measure frequency of the horizontal synchronizing signal and audio PCM frame synchronizing signal frequencies is supplied to a waveform shaping circuit 82 to obtain a phase shift ahead or delay and to adjust the pulse width and to obtain a pulse signal synchronized with the blanking period. By supplying the pulse signal to a pulse clamp circuit 83, a perfect dc regeneration by clamping the blanking period of the input signal may be effected.

One practical embodiment of such pulse clamp circuit 83 is shown in FIG. 7. Output pulse signals of the waveform shaping circuit 82 is supplied to pulse applying terminals 91 and 92 through an inverter (not shown) in order to apply them with negative polarity to the terminal 91 and with positive polarity to the terminal 92. Then, by applying the composite signal to an input terminal of this circuit, a composite signal having no dc level variation is obtained from the output thereof.

The dc level suppressed signal is supplied to comparators 56, 57, 58 in the identification circuit 43 to compare it with three reference voltages $E_1$, $E_2$, $E_3$ and then the comparators apply their output signals to edged trigger flip-flop circuits 59, 60, 61. To each of the edged trigger flip-flop circuits 59–61, the bit synchronizing signal regenerated from the bit synchronizing signal regenerator 41 is applied and the signals are identified with timing of the bit synchronizing signal. As for the identification circuits 43 and 81, and type of the conventional identification circuits may be used.

In the manner explained above, exact quarternary identified pulse signals are obtained at the output terminals 45, 46, 47 of the identification circuit 43. The output signals may be converted to binary pulse signals according to the need and the voice signal may be reproduced by supplying it to a digital converter (not shown).

As for the video signal, the output signal of the pulse clamp circuit 83 is clamped for the dc level so that by deriving the video signal to be supplied to the video frame memory 25 from the output of the pulse clamp circuit 83, a correct video signal can be regenerated.

As for the video frame memory 25, the well known storage tubes or magnetic recording and reproducing apparatus using a magnetic drum or magnetic disc rotating once per one TV frame may be used.

FIG. 8 is a block diagram showing an essential portion of a different embodiment according to the present invention. In FIG. 8, 84 is a peak clamp circuit which is well known in the art and which may be formed by a diode and a condenser. The other circuit portion of FIG. 8 besides the peak clamp circuit 84 is identical with that shown in FIG. 4. In the present embodiment, the composite signal to be supplied to the identification circuit 81 for regenerating the synchronizing signals is processed for dc regeneration to some extent by passing the signal through a peak clamp circuit 84 so as to obtain identification of the binary synchronizing signal in a more definite manner. By using this means a very stable synchronizing signal regeneration is possible even in case the input composite signal has a small amplitude, at a time of deterioration of the S/N ratio or dc level variation, or if the signal contains large ripples, etc. To this end, the regenerated synchronizing signal is processed for pulse clamping by the pulse clamp circuit 83 so that the identification circuit 43 can make definite identification even in the case of the quarternary signal.

Figure 9:
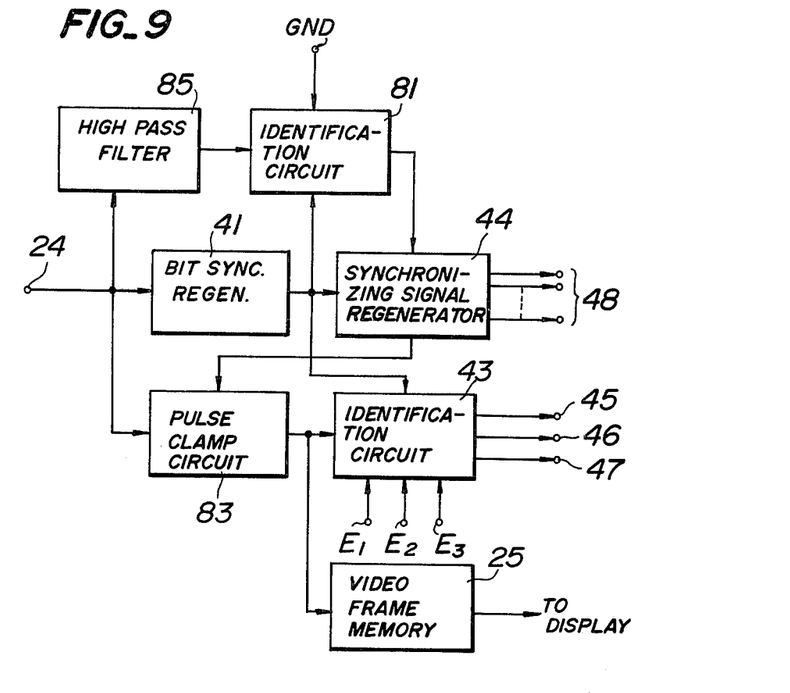
Figure 10:
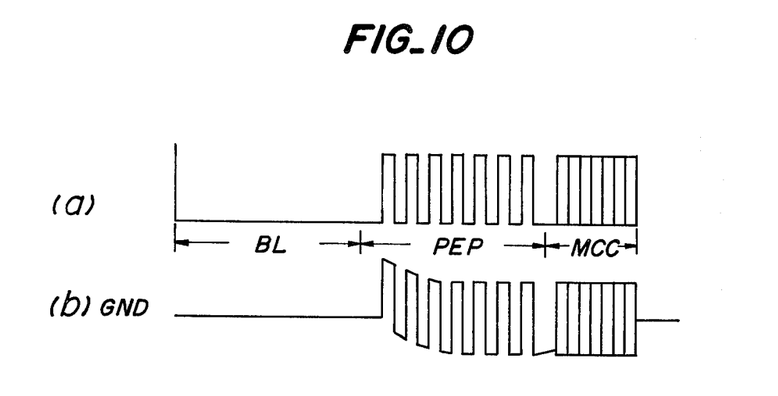
FIG. 10 is a signal waveform diagram for explaining part of the operation of the circuit shown in FIG. 9.

FIG. 9 is a block diagram for showing a still further modified embodiment of the present invention. This figure shows only the essential portion of the circuit, in which 85 is a high-pass filter. The other portion is also the same as the previous circuit arrangements. In this embodiment, a high-pass filter 85 is provided at a position prior to the identification circuit 81 for identifying the synchronizing signal so as to eliminate an influence of the dc level variation by removing the dc component. The high-pass filter 85 may be formed as a simple CR filter using capacitor and resistor elements. By passing the high-pass filter, low frequency components of the pulse signal are removed and for instance the PFP signal and the MCC signal may assume a waveform as shown in FIG. 10. Namely, FIG. 10a shows a waveform of the input synchronizing signal having the dc level fixed and FIG. 10b shows a waveform after passing the high-pass filter 85. As shown in FIG. 10b, some extent of deviation is observed but the average level is adjusted at nearly perfect 0 voltage or an earth voltage so that by setting the reference level for the identification in the identification circuit 81 to be the zero potential, the dc level variation of the input composite signal or low frequency ripples in the same may be completely eliminated from their influence. However, according to the selection of the time constant CR depending on the capacitor and the resistor forming the filter, the extent of the deviation may vary so that the regeneration of the front portion of the PFP signal becomes difficult. However, in a practical synchronizing circuit, all of the 16 bit patterns of the PFP signal need not be detected in the detection of the PFP signal and the MCC signal for a regeneration of the synchronizing signal. Namely, so far as the probability of the incidental appearance of the same pattern with the PFP signal at a signal portion other than the PFP signal in the coincidence circuit for detecting the PFP signal or the MCC signal is sufficiently low, an error may not occur even by obtaining a coincidence by a pattern with a bit number less than 16 bits. For instance, the probability of appearance of a pattern previously formed by $n$ bit pulses coincides with a meaningless coded pulse signal or in other words the probability of appearance of a pattern when the 1 and 0 of a pulse series are produced unintentionally will be $\frac{1}{2}^n$. Accordingly, by choosing the value $n$ more than a certain value, the erroneous detection will be very small. Furthermore, in practice the PFP signal is inserted at a regular repetition period, for instance, inserted at each horizontal scanning period or audio PCM frame period so that by utilizing the regular periodicity, an error may easily be identified even if such error is detected occasionally so that the detecting bit number can be decreased.

By using the example as shown in FIG. 9 not only the dc level variation and the influence of the ripples in the input signal can be eliminated, but also an influence in the case of the variation of the amplitude of the input signal is eliminated so far as the amplitude of the input signal has a considerable value and still further stable regeneration of the synchronizing signal may be obtained than the case shown in FIG. 8.

What is claimed is:

1. A receiver for receiving a composite signal including multivalue pulse series which are multivalue pulse code modulated so as to be representative of an information signal to be transferred, a plurality of blanking periods at predetermined positions in said multivalue pulse series, first synchronizing signals each including a binary pulse series of a specified code figure synchronized with said multivalue pulse series of said information signal, and second synchronizing signals each located to follow one of said first synchronizing signals and formed of binary coded pulses required for the reproduction of the information signal, and for reproducing said information signal, the receiver comprising:
   means for regenerating a clock pulse series synchronized with the multivalue pulse series including means for detecting the timing of said multivalue pulse series and the first synchronizing signals from said composite signal;
   first identification means for identifying said first synchronizing signals from said composite signal;
   means for obtaining pulse signals synchronized with said blanking periods including means for using the first synchronizing signals;
   pulse clamping means for pulse clamping said composite signal including means for using the pulse signals; and
   second identification means for identifying said multivalue pulse series from the clamped composite signal obtained with said pulse clamping means including means for using the regenerated clock pulse series.

2. A receiver according to claim 1, wherein said means for obtaining pulse signals includes first means for detecting and regenerating at least a part of said second synchronizing signals upon identification of said first synchronizing signals by the first identification means and means for generating the pulse signals synchronized with said blanking periods including means for using the part of the second synchronizing signals.

3. A receiver for a still picture broadcasting signal for receiving a composite signal including video signals, multivalue pulse series which are pulse code modulated by audio signals, and combined synchronizing signal groups including first synchronizing signals each formed of binary pulse series of a specified code figure synchronized with said multivalue pulse series of the audio signals and second synchronizing signals each formed of binary coded pulse series required for the reproduction of said video and audio signals, and blanking periods and inserted in predetermined positions in said video signals and the multivalue pulse series, and for reproducing said video and audio signals, the receiver comprising:
   means for regenerating clock pulse series synchronized with said multivalue pulse series including means for detecting the timing of said first synchronizing signals from said composite signal;
   first identification means for identifying said composite signal as binary pulse signals including means for using a preselected threshold level under synchronized conditions with said regenerated clock pulse series;
   means for detecting and regenerating at least a part of said second synchronizing signals from the composite signal identified as the binary pulse signals by said first identification means;
   means for producing pulse signals synchronized with said blanking periods including means for using the part of said second synchronizing signals regenerated;
   pulse clamp means for pulse clamping the composite signal including means for using said pulse signals synchronized with said blanking periods; and
   second identification means for identifying the audio signals as multivalue pulse series from the composite signal, which is pulse clamped by said pulse clamp means, under synchronization conditions with the regenerated clock pulse series.

4. A receiver according to claim 3, which further comprises a video memory for detecting said video signals from the pulse clamped composite signal clamped by said pulse clamp means and for recording and repeatedly reproducing at least a video signal corresponding at least to one picture.

5. A receiver according to claim 3, which further comprises a peak clamp circuit for peak clamping said composite signal, the output of said peak clamp circuit being connected to the input of said first identification means for identifying said composite signal as binary pulse signals.

6. A receiver according to claim 3, which further comprises a filter for preventing passage of lower frequency components of said composite signal, the output of said filter being connected to the input of said first identification means for identifying said composite signal as binary pulse signals.

* * * * *